(12) United States Patent
Porath et al.

(10) Patent No.: US 11,386,042 B2
(45) Date of Patent: Jul. 12, 2022

(54) SNAPSHOT-ENABLED STORAGE SYSTEM IMPLEMENTING ALGORITHM FOR EFFICIENT READING OF DATA FROM STORED SNAPSHOTS

(71) Applicant: EMC IP Holding Company LLC, Hopkinton, MA (US)

(72) Inventors: Asaf Porath, Tel Aviv (IL); Itay Keller, Tel Aviv (IL); Yonatan Shtarkman, Tel Aviv (IL); Michal Yarimi, Rehovot (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 659 days.

(21) Appl. No.: 16/343,949

(22) PCT Filed: Mar. 29, 2019

(86) PCT No.: PCT/US2019/024900
§ 371 (c)(1),
(2) Date: Apr. 22, 2019

(87) PCT Pub. No.: WO2020/204882
PCT Pub. Date: Oct. 8, 2020

(65) Prior Publication Data
US 2021/0357361 A1    Nov. 18, 2021

(51) Int. Cl.
*G06F 16/11* (2019.01)
*G06F 16/13* (2019.01)
*G06F 16/182* (2019.01)

(52) U.S. Cl.
CPC ........... *G06F 16/128* (2019.01); *G06F 16/13* (2019.01); *G06F 16/1844* (2019.01)

(58) Field of Classification Search
CPC .... G06F 16/128; G06F 16/13; G06F 16/1844; G06F 3/061; G06F 3/065; G06F 3/067; G06F 3/0685
See application file for complete search history.

(56) References Cited

U.S. PATENT DOCUMENTS

| 513,978 | A | * | 2/1894 | Bledsoe | ................. | G09F 3/204 |
|---|---|---|---|---|---|---|
|  |  |  |  |  |  | 40/642.02 |
| 4,672,542 | A | * | 6/1987 | Roux | .................... | G01T 1/1642 |
|  |  |  |  |  |  | 250/369 |

(Continued)

FOREIGN PATENT DOCUMENTS

| WO | 2016111954 A1 | 7/2016 |
|---|---|---|
| WO | PCT/US2019/024885 | 1/2020 |
| WO | PCT/US2019/024900 | 1/2020 |

OTHER PUBLICATIONS

Dell EMC, "Dell EMC VxRack FLEX," Dell EMC Product Overview, 2018, 5 pages.

(Continued)

*Primary Examiner* — Ramon A. Mercado
(74) *Attorney, Agent, or Firm* — Ryan, Mason & Lewis, LLP

(57) ABSTRACT

An apparatus in an illustrative embodiment comprises at least one processing device comprising a processor coupled to a memory. The apparatus is configured to maintain a snapshot tree data structure having a plurality of volume nodes corresponding to respective ones of (i) a root volume and (ii) multiple snapshots related directly or indirectly to the root volume. The apparatus is further configured to receive a request to read a data item from a given volume offset of a particular one of the volume nodes, to determine a set of data descriptors for the given volume offset, to determine a set of volume nodes of interest for the particular volume node, to determine a contribution set based at least (Continued)

in part on the set of data descriptors and the set of volume nodes of interest, to determine a read address for the data item as a function of the contribution set, and to read the data item from the read address.

20 Claims, 6 Drawing Sheets

(56) References Cited

U.S. PATENT DOCUMENTS

| | | | | |
|---|---|---|---|---|
| 4,921,188 | A * | 5/1990 | Smith | A01K 89/01 |
| | | | | D22/141 |
| 6,769,054 | B1 * | 7/2004 | Sahin | G06F 11/3684 |
| | | | | 717/124 |
| 7,444,464 | B2 | 10/2008 | Urmston et al. | |
| 8,095,726 | B1 | 1/2012 | O'Connell et al. | |
| 8,214,612 | B1 | 7/2012 | Natanzon | |
| 8,301,593 | B2 | 10/2012 | Hoffmann et al. | |
| 9,104,326 | B2 | 8/2015 | Frank et al. | |
| 9,208,162 | B1 | 12/2015 | Hallak et al. | |
| 9,286,003 | B1 | 3/2016 | Hallak et al. | |
| 9,514,014 | B2 * | 12/2016 | Webman | G06F 3/0619 |
| 9,552,258 | B2 | 1/2017 | Hallak et al. | |
| 9,606,870 | B1 | 3/2017 | Meiri et al. | |
| 9,716,754 | B2 | 7/2017 | Swift | |
| 10,176,046 | B1 | 1/2019 | Hu et al. | |
| 10,261,693 | B1 | 4/2019 | Schneider et al. | |
| 10,324,640 | B1 | 6/2019 | Chen et al. | |
| 10,338,851 | B1 | 7/2019 | Kronrod et al. | |
| 10,359,965 | B1 | 7/2019 | Stronge et al. | |
| 10,394,485 | B1 | 8/2019 | Chen et al. | |
| 10,437,501 | B1 | 10/2019 | Kucherov et al. | |
| 10,437,855 | B1 | 10/2019 | Strange et al. | |
| 10,466,925 | B1 | 11/2019 | Blanco et al. | |
| 10,496,324 | B2 | 12/2019 | Meiri et al. | |
| 10,496,489 | B1 | 12/2019 | Chen et al. | |
| 10,496,672 | B2 | 12/2019 | Meiri et al. | |
| 2002/0042698 | A1 * | 4/2002 | Meuris | G06F 30/367 |
| | | | | 703/2 |
| 2002/0073103 | A1 * | 6/2002 | Bottomley | G06F 12/0253 |
| 2005/0066095 | A1 * | 3/2005 | Mullick | G06F 16/1774 |
| | | | | 710/200 |
| 2008/0279462 | A1 | 11/2008 | Celi, Jr. | |
| 2009/0132955 | A1 | 5/2009 | Garg et al. | |
| 2009/0157989 | A1 * | 6/2009 | Karamcheti | G06F 12/0246 |
| | | | | 711/E12.001 |
| 2009/0276593 | A1 | 11/2009 | Jacobson et al. | |
| 2010/0179941 | A1 | 7/2010 | Agrawal et al. | |
| 2013/0305002 | A1 * | 11/2013 | Hallak | G06F 3/0683 |
| | | | | 711/E12.103 |
| 2013/0325824 | A1 | 12/2013 | Shoens | |
| 2014/0181016 | A1 | 6/2014 | Whitehead et al. | |
| 2014/0244935 | A1 * | 8/2014 | Ezra | G06F 3/0614 |
| | | | | 711/133 |
| 2014/0344539 | A1 * | 11/2014 | Gordon | G06F 16/128 |
| | | | | 711/162 |
| 2015/0378785 | A1 | 12/2015 | Tarasuk-Levin et al. | |
| 2016/0150012 | A1 | 5/2016 | Barszczak et al. | |
| 2016/0170987 | A1 | 6/2016 | Kesselman | |
| 2016/0202927 | A1 | 7/2016 | Klarakis et al. | |
| 2016/0224259 | A1 | 8/2016 | Ahrens et al. | |
| 2017/0192857 | A1 | 7/2017 | Meiri et al. | |
| 2018/0267985 | A1 * | 9/2018 | Badey | G06F 16/128 |
| 2019/0220360 | A1 * | 7/2019 | Kashi Visvanathan | |
| | | | | G06F 3/0608 |
| 2019/0303490 | A1 | 10/2019 | Chen et al. | |
| 2020/0363960 | A1 * | 11/2020 | Valaguru | G06F 3/064 |
| 2021/0157504 | A1 * | 5/2021 | Hinman | G06F 3/067 |
| 2021/0303407 | A1 * | 9/2021 | Keller | G06F 16/9027 |
| 2021/0357361 | A1 * | 11/2021 | Porath | G06F 3/061 |

OTHER PUBLICATIONS

EMC Corporation, "Introduction to the EMC XtremIO Storage Array (Ver. 4.0): A Detailed Review," White Paper, Apr. 2015, 65 pages.

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Protection (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

EMC Corporation, "High Availability, Data Protection and Data Integrity in the XtremIO Architecture," White Paper, Apr. 2015, 28 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

Dell EMC, "PowerMax OS," Dell EMC PowerMax Family Product Guide, May 2019, 192 pages.

U.S. Appl. No. 15/793,121 filed in the name of David Meiri et al., filed Oct. 25, 2017, and entitled "Opportunistic Compression of Replicated Data in a Content Addressable Storage System."

U.S. Appl. No. 15/662,708 filed in the name of Xiangping Chen et al., filed Jul. 28, 2017, and entitled "Token-Based Data Flow Control in a Clustered Storage System."

U.S. Appl. No. 15/824,536 filed in the name of Christopher Sayles et al., filed Nov. 28, 2017, and entitled "Storage System with Asynchronous Messaging between Processing Modules for Data Replication."

U.S. Appl. No. 16/037,050 filed in the name of Ying Hu et al., filed Jul. 17, 2018, and entitled "Storage System with Multiple Write Journals Supporting Synchronous Replication Failure Recovery."

U.S. Appl. No. 16/253,793 filed in the name of Yuval Harduf et al., filed Jan. 22, 2019, and entitled "Storage System with Data Consistency Checking in Synchronous Replication Using Active Snapshot Set."

U.S. Appl. No. 16/396,897 filed in the name of Anton Kucherov et al., filed Apr. 29, 2019, and entitled "Storage System with Deduplication-Aware Replication Implemented Using a Standard Storage Command Protocol."

U.S. Appl. No. 16/413,050 filed in the name of Xiangping Chen et al., filed May 15, 2019, and entitled "Storage System with Coordinated Recovery across Multiple Input-Output Journals of Different Types."

U.S. Appl. No. 16/265,131 filed in the name of Lior Kamran et al., filed Feb. 1, 2019, and entitled "Storage System with Write Cache Release Protection."

U.S. Appl. No. 16/343,942 filed in the name of Yonatan Shtarkman et al., filed Apr. 22, 2019, and entitled "Snapshot-Enabled Storage System Implementing Algorithm for Efficient Reclamation of Snapshot Storage Space."

* cited by examiner

Example Implementation of $read(v, o)$

1. Given $D_o$ for some volume offset $o$:
   Traverse $D_o$ beginning at its *last* member, which has the latest (biggest) Time.
2. For each data descriptor $d_{o,i}$:
   a. if $Host(d_{o,i}) = v$, then:
      return $Address(d_{o,i})$ ∎
   b. if $IntermediateParent(v, V[Host(d_{o,i})]) = \emptyset$, then:
      Go to 2d.
   c. if $Time(d_{o,i})$
      $< Time(IntermediateParent(v, V[Host(d_{o,i})]))$, then:
      return $Address(d_{o,i})$ ∎
   d. if $i > 0$ then:
      set $i := i - 1$ and Go to 2.
3. return $NIL$ ∎

FIG. 3

SNAPSHOT-ENABLED STORAGE SYSTEM IMPLEMENTING ALGORITHM FOR EFFICIENT READING OF DATA FROM STORED SNAPSHOTS

RELATED APPLICATION(S)

The present application is a U.S. national stage application of PCT Patent Application No. PCT/US2019/024900, filed Mar. 29, 2019, which is related to PCT Patent Application No. PCT/US2019/024885, filed Mar. 29, 2019, and entitled "Snapshot-Enabled Storage System Implementing Algorithm for Efficient Reclamation of Snapshot Storage Space," which is incorporated by reference herein in its entirety.

FIELD

The field relates generally to information processing systems, and more particularly to storage in information processing systems.

BACKGROUND

Conventional block storage systems are configured to support logical units (LUNs) or other types of storage volumes into which users may write data and from which that data may be read. Users may choose to place data intended for specific uses/applications into separate volumes, so that the data can be easily managed and distinguished. Most storage systems also support functionality for generating volume snapshots. A given such snapshot illustratively comprises a point-in-time copy of the volume. The volume snapshot generation functionality therefore provides the ability to "freeze" the data in a volume at a certain point in time. A given such snapshot can also serve as the source for other snapshots that are spawned from it (e.g., in use cases involving backups). Snapshots can usually be deleted by a user at will, without any type of restrictions.

A simplistic approach for snapshot generation involves duplicating all data of the source volume at the time of snapshot creation. However, this simplistic approach is not only time-consuming, but also highly inefficient in terms of storage space. A better approach is to store just the data unique to that particular snapshot, with any reads to other non-uniquely written regions being redirected to a previous snapshot or the original volume. This approach results in sparsely-populated snapshots each of which includes just the uniquely-written data of that particular snapshot. Since the entire data set is not duplicated in this approach, the uniquely-written data is stored in association with additional information, commonly referred to as metadata, which identifies where, in a volume offset domain, the data belongs. This facilitates both access to the unique data itself, and the ability to determine whether redirection to another snapshot or the original volume is required.

Although storing only uniquely-written data within snapshots enables optimal storage space utilization, conventional techniques for reading particular data items of a volume from the sparsely-populated snapshots tend to be inefficient, and can undermine the overall performance of the storage system.

SUMMARY

Illustrative embodiments include snapshot-enabled storage systems configured for efficient reading of data from stored snapshots of a volume. For example, some embodiments implement highly efficient algorithms for identifying the appropriate snapshot from which a given data item should be read, a process also referred to herein as "snapshot resolution," and for reading the given data item from that identified snapshot. Such algorithms are advantageously configured in some embodiments to support overwrites of data items and deletion of snapshots, with the former introducing multiple metadata entries per the same volume offset and the latter purging such entries.

The snapshot-enabled storage system in some embodiments is implemented as a distributed storage system comprising multiple storage nodes each having replication control logic and an associated snapshot generator. Numerous other storage system implementations are possible in other embodiments.

An apparatus in one illustrative embodiment comprises at least one processing device comprising a processor coupled to a memory. The apparatus is configured to maintain a snapshot tree data structure having a plurality of volume nodes corresponding to respective ones of (i) a root volume and (ii) multiple snapshots related directly or indirectly to the root volume. The apparatus is further configured to receive a request to read a data item from a given volume offset of a particular one of the volume nodes, to determine a set of data descriptors for the given volume offset, to determine a set of volume nodes of interest for the particular volume node, to determine a contribution set based at least in part on the set of data descriptors and the set of volume nodes of interest, to determine a read address for the data item as a function of the contribution set, and to read the data item from the read address.

In some embodiments, determining the contribution set illustratively comprises determining the contribution set based at least in part on one or more intermediate parents of the particular volume node, wherein a given one of the intermediate parents of the particular volume node relative to another volume node denotes a volume node that is both an ancestor of the particular volume node and a child of the other volume node. The one or more intermediate parents are illustratively utilized to determine the contribution set by identifying a particular subset of the set of data descriptors based at least in part on time values of one or more data items and time values of one or more volume nodes.

These and other illustrative embodiments include, without limitation, apparatus, systems, methods and processor-readable storage media.

BRIEF DESCRIPTION OF THE DRAWINGS

FIG. 3 shows an example algorithm for efficient reading of data from stored snapshots in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous different types of enterprise computing and storage systems are also encompassed by the term "information processing system" as that term is broadly used herein.

Figure 1:
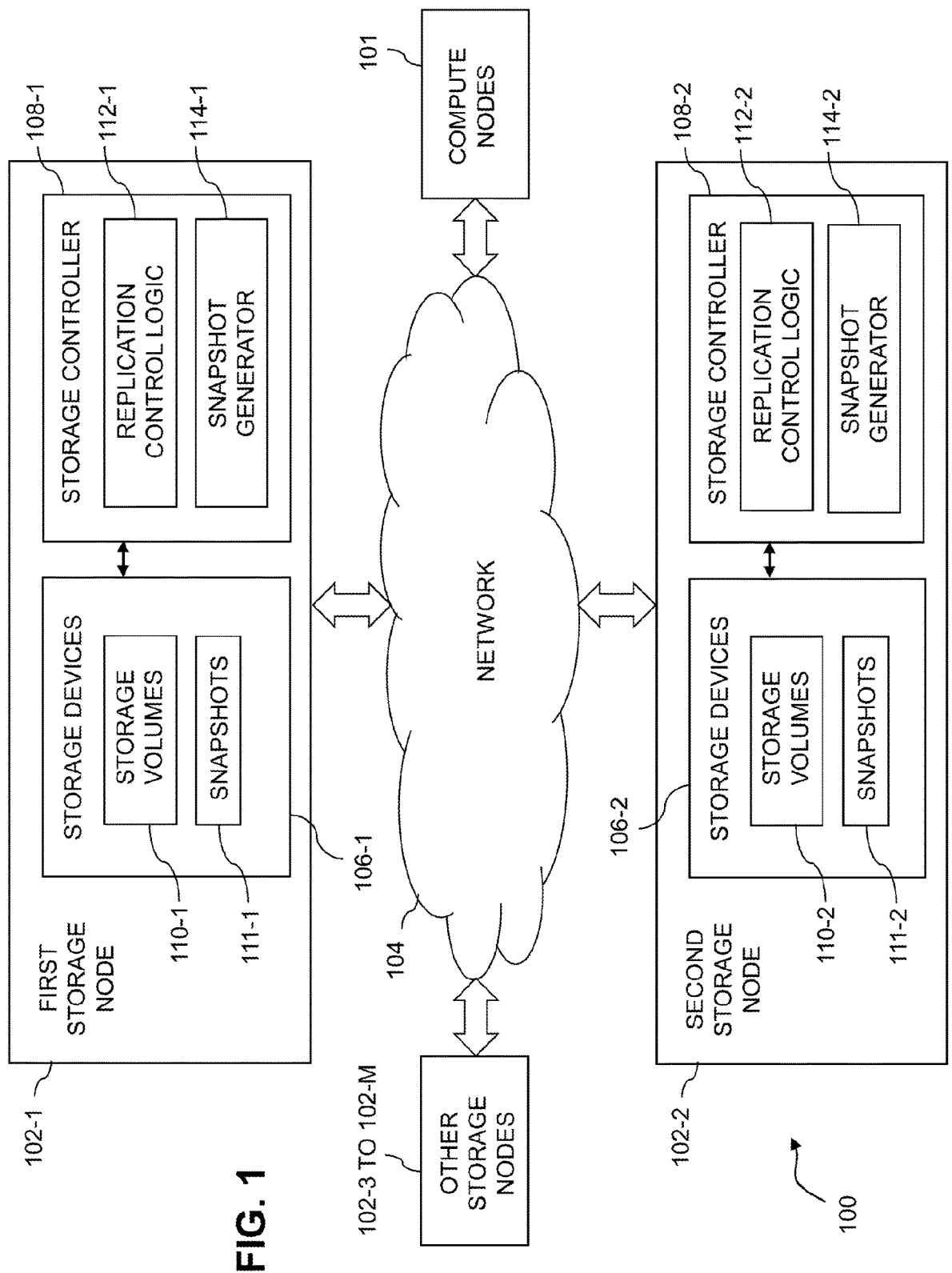
FIG. 1 is a block diagram of an information processing system comprising one or more snapshot-enabled storage systems in an illustrative embodiment.

FIG. 1 shows an information processing system 100 configured in accordance with an illustrative embodiment. The information processing system 100 comprises a plurality of compute nodes 101, a first storage node 102-1, a second storage node 102-2, and additional storage nodes 102-3 through 102-M, all of which are configured to communicate with one another over a network 104. The first and second storage nodes 102 are more particularly configured in this embodiment to participate in a replication process in which at least portions of one or more storage volumes are replicated from the first storage node 102-1 to the second storage node 102-2, possibly with involvement of at least one of the compute nodes 101. Such a replication process illustratively involves generation of multiple snapshots for each of one or more storage volumes on the storage nodes 102.

Each of the storage nodes 102 is illustratively associated with a corresponding set of one or more of the compute nodes 101. The compute nodes 101 illustratively comprise servers or other types of computers of an enterprise computer system, cloud-based computer system or other arrangement of multiple compute nodes associated with respective users.

The compute nodes 101 in some embodiments illustratively provide compute services such as execution of one or more applications on behalf of each of one or more users associated with respective ones of the compute nodes. Such applications illustratively generate input-output (IO) operations that are processed by a corresponding one of the storage nodes 102. The term "input-output" as used herein refers to at least one of input and output. For example, IO operations may comprise write requests and/or read requests directed to stored data of a given one of the storage nodes 102.

The storage nodes 102 illustratively comprise respective processing devices of one or more processing platforms. For example, the storage nodes 102 can each comprise one or more processing devices each having a processor and a memory, possibly implementing virtual machines and/or containers, although numerous other configurations are possible.

The storage nodes 102 can additionally or alternatively be part of cloud infrastructure such as an Amazon Web Services (AWS) system. Other examples of cloud-based systems that can be used to provide at least portions of the storage nodes 102 include Google Cloud Platform (GCP) and Microsoft Azure.

The storage nodes 102 may be implemented on a common processing platform, or on separate processing platforms.

The compute nodes 101 are illustratively configured to write data to and read data from the storage nodes 102 in accordance with applications executing on those compute nodes for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

It is possible that a given one of the storage nodes 102 can additionally implement functionality of a compute node, and vice-versa. The term "storage node" as used herein is therefore intended to be broadly construed, and a storage system in some embodiments can be implemented using a combination of storage nodes and compute nodes.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The storage nodes 102, possibly in combination with one or more of the compute nodes 101, collectively implement at least one instance of what is more generally referred to herein as a "snapshot-enabled storage system." A snapshot-enabled storage system in illustrative embodiments comprises a distributed storage system implemented by a plurality of storage nodes and having a distributed storage controller comprising multiple controller instances implemented on respective ones of the storage nodes. A wide variety of different node arrangements and configurations can be used to implement such a snapshot-enabled storage system, and embodiments are not limited in this regard.

In the illustrative embodiment shown in FIG. 1, the first storage node 102-1 comprises a plurality of storage devices 106-1 and an associated storage controller 108-1. The storage devices 106-1 store storage volumes 110-1. The storage volumes 110-1 illustratively comprise respective logical units (LUNs) or other types of logical storage volumes. Also stored in the storage devices 106-1 are snapshots 111-1 generated from one or more of the storage volumes 110-1.

Similarly, the second storage node 102-2 comprises a plurality of storage devices 106-2 and an associated storage controller 108-2. The storage devices 106-2 store storage volumes 110-2, at least a portion of which represent respective LUNs or other types of logical storage volumes that are replicated from the first storage node 102-1 to the second storage node 102-2 in accordance with a replication process. Also stored in the storage devices 106-2 are snapshots 111-2 generated from one or more of the storage volumes 110-2.

The storage devices 106 of the storage nodes 102 illustratively comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices may also be used. For example, hard disk drives (HDDs) can be used in combination with or in place of SSDs or other types of NVM devices.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives or other types of SSDs while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

By way of example, the storage nodes 102 in some embodiments are implemented in the form of a VxRack™ FLEX rack-scale hyper-converged infrastructure system commercially available from Dell EMC of Hopkinton, Mass. A given VxRack™ FLEX system creates a server-based storage area network (SAN) by combining virtualization software, referred to as VxFlex OS, with Dell EMC PowerEdge servers to deliver flexible, scalable performance, and capacity on demand. Local storage resources are combined to create a virtual pool of block storage with varying performance tiers. The VxRack™ FLEX system architecture can be scaled from as few as four nodes to over a thousand nodes.

Such an arrangement is an example of an embodiment in which the storage nodes 102 are implemented at least in part using software-defined storage products, such as products previously known as ScaleIO™ from Dell EMC. For example, the storage controllers 108 in some embodiments of this type can be implemented at least in part as respective software-defined storage controllers. These arrangements can also support hundreds or thousands of storage nodes, or more. Replication processes implemented in such software-defined storage systems can protect the systems from failures in one or more of the storage nodes, thereby providing fault tolerance and high availability.

As another example, the system 100 can be configured to implement distributed replica based storage of the type described in U.S. Pat. No. 9,514,014, entitled "Methods and Systems of Managing a Distributed Replica Based Storage," which is incorporated by reference herein in its entirety. Such replicas may be viewed as examples of what are more generally referred to as "snapshots" herein.

In some embodiments of distributed replica based storage disclosed in U.S. Pat. No. 9,514,014, volume partitions may be mapped to storage managing modules and to storage drives associated with respective nodes. The storage managing modules may be viewed as examples of what are more generally referred to herein as "storage controllers" of respective storage nodes. A given storage space in such an embodiment illustratively comprises a non-fully-consecutive address space that represents a set of different storage capacities allocated for storing data blocks of different volumes. The storage space may be divided into multiple domains, where each domain comprises a subspace of addresses, optionally non-consecutive, that is optionally associated with certain storage properties. Each domain is illustratively allocated for storing certain block volumes, and a volume is fully mapped to a domain. Multiple volumes may be mapped to the same domain.

A given domain illustratively comprises one or more sets of replicas, referred to herein as replica sets or virtual RAID groups (VRGs), where RAID denotes redundant array of independent disks. A VRG that includes one or more replicas of data is a sub-space of the storage space, optionally non-consecutive, that represents addresses of a storage system with certain properties that is allocated for storing data blocks of volumes.

A volume may be mapped to multiple VRGs of the same domain, and need not be divided in a balanced manner among the multiple VRGs. A replica set optionally contains a number of replicas, for example N virtual RAID0 groups (VR0Gs), where N depends on the high-level RAID level (e.g. RAID1, RAID4, 3-Copy-RAID1 and the like). For example, RAID1 requires 2 similar VR0Gs, one acting as a primary copy and the second as a secondary (minor) copy, RAID4 requires at least 3 similar VR0Gs where one of them acts as a parity group, and 3-Copy-RAID1 requires 3 similar VR0Gs, where one is a primary copy and the second and third act as minor copies. If no redundancy is applied, only a single VR0G is required.

A given replica (e.g., a VR0G) may be divided into a plurality of continuous data blocks, referred to herein as volume allocation extents (VAEs), which may be striped along a set of N virtual disks (VDs), optionally equally sized. A VD is a consecutive address space of blocks which are managed by a single storage managing module, optionally among other VDs. A VD may or may not have a 1:1 mapping with any physical disk in the system. Optionally, each replica space is divided to VAEs which are symmetrically striped across all its VDs, optionally as any standard RAID0 disk array. Note that each VAE may be divided to stripes having equal size fragments, for example, a 16 megabyte (MB) VAE may be striped along 16 VDs with a fragment size of 1 MB. Other embodiments can use different types of replicas, including replicas not involving use of RAID techniques.

Numerous other storage system arrangements are possible. For example, in some embodiments, at least one of the storage nodes 102 illustratively comprises a storage node of a scale-out all-flash content addressable storage array such as an XtremIO™ storage array from Dell EMC. Other types of storage arrays, including by way of example VNX® and Symmetrix VMAX® storage arrays also from Dell EMC, can be used to implement storage nodes 102 in other embodiments.

The term "storage system" as used herein is therefore intended to be broadly construed, and should not be viewed as being limited to storage systems of any particular type or types. A given storage system as the term is broadly used herein can comprise, for example, one or more of the above-noted SANs, network-attached storage (NAS), direct-attached storage (DAS) and distributed DAS, as well as combinations of these and other storage types, including software-defined storage.

Other particular types of storage products that can be used in implementing storage nodes 102 in illustrative embodiments include all-flash and hybrid flash storage arrays such as Unity™, cloud storage products such as Elastic Cloud Storage (ECS), object-based storage products such as Atmos®, and scale-out NAS clusters comprising Isilon® platform nodes and associated accelerators, all also available from Dell EMC. Combinations of multiple ones of these and other storage products can also be used in implementing a given storage system in an illustrative embodiment.

Accordingly, although illustrative embodiments are described in conjunction with particular storage system arrangements, it is to be appreciated that a wide variety of other storage systems can be adapted in a straightforward manner to incorporate efficient snapshot processing functionality as disclosed herein.

In some embodiments, communications between the compute nodes 101 and the storage nodes 102 comprise Small Computer System Interface (SCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands or other types of communications between components of system 100 can be used in other embodiments.

The storage controller 108-1 of first storage node 102-1 in the FIG. 1 embodiment includes replication control logic 112-1 and a snapshot generator 114-1. The snapshot generator 114-1 illustratively generates at least a portion of the snapshots 111-1 under the control of the replication control logic 112-1.

Similarly, the storage controller 108-2 of second storage node 102-2 includes replication control logic 112-2 and a snapshot generator 114-2. The snapshot generator 114-2 illustratively generates at least a portion of the snapshots 111-2 under the control of the replication control logic 112-2.

The other storage nodes 102-3 to 102-M are each assumed to be configured in a manner similar to that shown for storage nodes 102-1 and 102-2. It is to be appreciated, however, that numerous other storage node configurations can be used in other embodiments. One or more of the compute nodes 101 can also include components similar to those illustrated in the figure for storage nodes 102-1 and 102-2.

Although not explicitly shown in the figure, additional components can be included in the storage controllers 108, such as drivers for respective ones of the storage devices 106. Such drivers in some embodiments comprise multi-path input-output (MPIO) drivers such as PowerPath® drivers from Dell EMC.

The instances of replication control logic 112-1 and 112-2 are collectively referred to herein as replication control logic 112. Such replication control logic instances are also referred to herein as individually or collectively comprising at least a portion of a "replication engine" of the system 100.

The replication control logic 112 of the storage nodes 102 controls performance of a replication process carried out between those storage nodes, which as noted above in some embodiments further involves at least one of the compute nodes 101. By way of example only, replication processes implemented in system 100 can include various known techniques for generating and managing distributed copies of storage volumes of a storage system, and/or techniques such as asynchronous and/or synchronous replication for providing failure recovery. The data replicated from the first storage node 102-1 to the second storage node 102-2 can include all of the data stored in the first storage node 102-1, or only certain designated subsets of the data stored in the first storage node 102-1, such as particular designated sets of LUNs or other logical storage volumes. Different replication processes of different types can be implemented for different parts of the stored data. Also, the storage nodes 102 can be configured to operate in different replication modes of different types at different times. For example, the storage nodes 102 can transition from an asynchronous replication mode to a synchronous replication mode and vice versa.

A given storage volume designated for replication from the first storage node 102-1 to the second storage node 102-2 illustratively comprises a set of one or more LUNs or other instances of the storage volumes 110-1 of the first storage node 102-1. Each such LUN or other storage volume illustratively comprises at least a portion of a physical storage space of one or more of the storage devices 106-1.

The corresponding replicated LUN or other storage volume of the storage volumes 110-2 of the second storage node 102-2 illustratively comprises at least a portion of a physical storage space of one or more of the storage devices 106-2.

The replication control logic 112 of the storage nodes 102 in some embodiments is configured to control the performance of corresponding portions of replication process. At least one of the compute nodes 101 in some embodiments can also include one or more instances of replication control logic and possibly also one or more snapshot generators, and can therefore participate in a replication process.

The storage controllers 108 of the storage nodes 102 should also be understood to include additional modules and other components typically found in conventional implementations of storage controllers and storage systems, although such additional modules and other components are omitted from the figure for clarity and simplicity of illustration.

It will be assumed for the following description of the FIG. 1 embodiment that there is an ongoing replication process being carried out between the first storage node 102-1 and the second storage node 102-2 in the system 100, utilizing their respective instances of replication control logic 112-1 and 112-2.

Operations associated with reading of data from stored snapshots and/or reclaiming snapshot storage space are illustratively performed as part of an ongoing replication process carried out between the first storage node 102-1 and the second storage node 102-2, and possibly also involving other storage nodes 102 and/or one or more of the compute nodes 101.

The snapshots 111 are illustratively organized and managed using data structures referred to herein as "snapshot tree data structures," or as simply "snapshot trees." A given such snapshot tree utilized for a particular one of the storage volumes 110 illustratively comprises a root node, at least one branch node, and a plurality of leaf nodes. The nodes illustratively correspond to different point-in-time copies of the storage volume.

An illustrative example of a snapshot tree will be described in more detail below in conjunction with FIG. 2. A wide variety of other types of snapshot trees and possibly one or more associated additional trees can be used in other embodiments. Also, the term "snapshot tree" as used herein is intended to be broadly construed so as to comprise any type of data structure characterizing a plurality of nodes, at least a subset of which are associated with respective snapshots, and a plurality of edges interconnecting respective pairs of the nodes.

The storage nodes 102 in the FIG. 1 embodiment are assumed to be implemented using at least one processing platform each comprising one or more processing devices each having a processor coupled to a memory. Such processing devices can illustratively include particular arrangements of compute, storage and network resources.

The storage nodes 102 may be implemented on respective distinct processing platforms, although numerous other arrangements are possible. At least portions of their associated compute nodes may be implemented on the same processing platforms as the storage nodes 102 or on separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the storage nodes 102 to reside in different data centers. Numerous other distributed implementations of the storage nodes 102 and their respective associated sets of compute nodes are possible.

Additional examples of processing platforms utilized to implement storage systems and possibly their associated compute nodes in illustrative embodiments will be described in more detail below in conjunction with FIGS. 5 and 6.

It is to be appreciated that these and other features of illustrative embodiments are presented by way of example only, and should not be construed as limiting in any way.

Accordingly, different numbers, types and arrangements of system components such as compute nodes 101, storage nodes 102, network 104, storage devices 106, storage controllers 108, storage volumes 110 and snapshots 111 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, in other embodiments, at least portions of the above-described snapshot processing functionality can be implemented in one or more compute nodes, or partially in a compute node and partially in a storage system. Illustrative embodiments are not limited to arrangements in which all such functionality is implemented in first and second storage nodes or a compute node, and therefore encompass various hybrid arrangements in which the functionality is distributed over one or more storage systems and one or more associated compute nodes, each comprising one or more processing devices.

References herein to "one or more processing devices" configured to implement particular operations or other functionality should be understood to encompass a wide variety of different arrangements involving one or more processing devices of at least one storage system and/or at least one compute node.

The operation of the information processing system 100 will now be described in further detail with reference to the additional diagrams of FIGS. 2 through 4. As will be described, illustrative embodiments implement techniques for efficient reading of data from stored snapshots and/or efficient reclamation of snapshot storage space, illustratively utilizing replication control logic instances and snapshot generators of storage controllers of at least first and second storage nodes. For example, replication control logic of one storage node interacts with replication control logic of another storage node in performing a replication process for one or more storage volumes. It is possible in other embodiments that at least one of the storage systems does not include replication control logic and a snapshot generator, and in such embodiments these components are instead implemented in one or more compute nodes.

Figure 2:
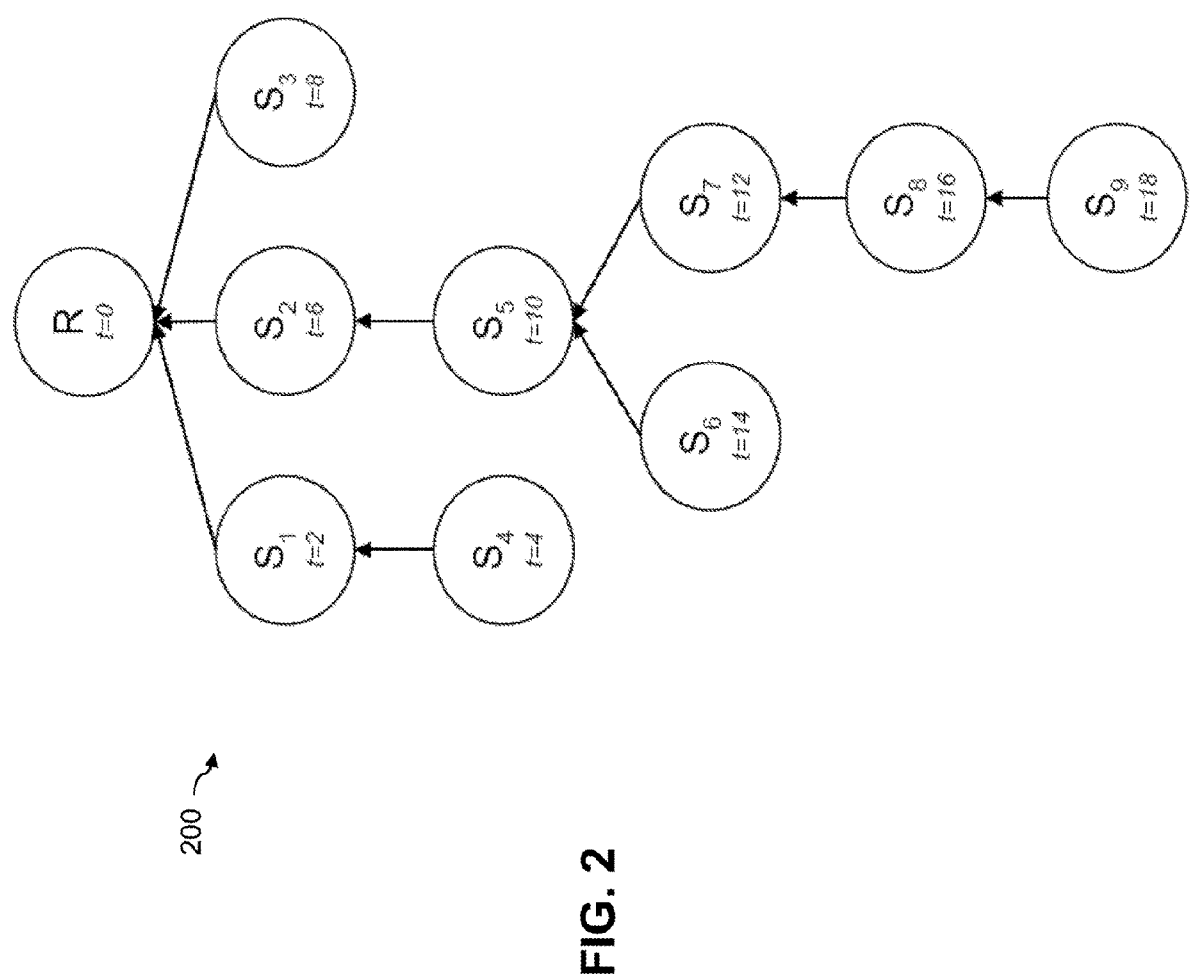
FIG. 2 shows an example of a snapshot tree for a storage volume in an illustrative embodiment.

FIG. 2 shows an example of a snapshot tree 200 maintained by one or more of the storage nodes 102 for a particular storage volume in the system 100. A given storage volume snapshot tree having a format of the type shown in FIG. 2 represents a storage volume and its snapshots over time.

In the snapshot tree 200, also referred to herein as a volume snapshot tree V, R is the root volume, and $S_i$ are respective snapshots taken over time. The variable t denotes the creation times for each of R and $S_i$. Certain portions of the description below will focus without loss of generality on a particular data item at a single particular volume offset. The size of the data item can vary depending upon the particular needs of a given implementation, and is not material to the description. However, it will be assumed for purposes of illustration that any two volume offsets represent non-overlapping data.

In the following description, each of R and $S_i$ is referred to as a "volume" and its corresponding node is referred to as a "volume node" of the snapshot tree. The root node in some cases more particularly denotes a source volume, and the remaining nodes denote respective snapshots generated from the source volume. Terms such as "volume" and "snapshot" as used herein are both intended to be broadly construed, and in some cases both terms are used to refer to a given node in a snapshot tree.

A volume v in the volume snapshot tree V is said to be the "host" to some data item $d_o$ at some volume offset o if the data item was written into v. Formally, $Host(d_o)=v$.

The "volume time" is the absolute time at which the volume/snapshot was created. Within a given volume's snapshot tree, it is established that no two snapshots will have the same time.

To facilitate the above, volume times in the present embodiment illustratively comprise integer values that are incremented upon snapshot creation.

The "data item time" is illustratively the absolute time at which the data item was written into its host. Within a given volume's snapshot tree, it is established that data times are always unique from volume times; i.e., a data item's time cannot be equal to any of the volume times. Note that two data items written to different snapshots can have the same time as long as no snapshots were created in between.

As one possible implementation of the above, the volume times can comprise respective even-numbered integer values that are incremented upon snapshot creation. Further, the data times can comprise odd-numbered integer values that satisfy: Time($d_o$)=1+Max(Time($v_i$)) for all $v_i$ within a volume snapshot tree. It is to be appreciated, however, that other volume time and data item time arrangements may be used.

Illustrative embodiments make use of what are referred to herein as "data descriptors." A data item $d_o$ is uniquely described by the set consisting of its host, its write time, and the actual data (e.g., a reference to its address on disk). Formally, $d_o = \langle(\text{Host}(d_o), \text{Time}(d_o), \text{Address}(d_o)\rangle$ Let $D_o$ denote the set of all data descriptors for a given volume offset:

$D_o = \{d_o | d_o$ describes a datum at volume offset o in some volumes tree V$\}$ Let $d_{o,i}$ denote the i-th member of $D_o$; the particular significance of i will become apparent from examples given below.

Volume snapshot tree relationships will now be described in more detail.

The direct descendants of a volume v in a volume snapshot tree V are called v's "children." Formally: Children(v)=$\{v' | v'$ is a direct descendant of v$\}$.

In the example snapshot tree 200 illustrated in FIG. 2, it can be seen that:

Children(R)=$\{S_1, S_2, S_3\}$
Children($S_5$)=$\{S_6, S_7\}$
Children($S_1$)=$\{S_4\}$
Children($S_6$)=$\emptyset$ The "ancestors" of a volume v in a volume snapshot tree V are all of the volumes $v_i$ that are encountered on a path between v and the root volume (including v itself). Such a path is always guaranteed to exist in V, since the volume snapshot tree represents a relationship of inheritance between the root volume and all its direct and indirect descendants.

For example, in the snapshot tree 200 of FIG. 2:

Ancestors($S_9$)=$\{R, S_2, S_5, S_7, S_8, S_9\}$

Note that the root volume itself may also be deleted, in which case it will be replaced as root by one of the surviving nodes; typically, by one of its children. It is assumed in illustrative embodiments herein that at any given time there shall be exactly one root to the graph, thereby guaranteeing the existence of a path to that root.

A volume v's "intermediate parent" with respect to some other volume v' in volume snapshot tree V is defined as a third volume, $v_{ip}$, that is both an ancestor of v and a son of v'. Formally: $v_{ip}$=IntermediateParent(v, v')=Ancestors(v)∩Children(v').

When v' is not an ancestor of v, the intermediate parent is the empty set $\emptyset$.

For example, with reference to the snapshot tree 200 of FIG. 2, it can be seen that:

IntermediateParent($S_9$, $S_8$)=$\{S_9\}$
IntermediateParent($S_9$, $S_7$)=$\{S_8\}$
IntermediateParent($S_9$, R)=$\{S_2\}$
IntermediateParent($S_9$, $S_4$)=$\emptyset$ An example algorithm for efficient reading of data from stored snapshots will now be described in detail. The algorithm illustratively determines the identity of the correct snapshot from which the data must be read, and the correct piece of data within that snapshot, if there are multiple pieces available.

In some embodiments of this type, one or more storage controllers or other processing devices of a storage system maintain a snapshot tree data structure having a plurality of volume nodes corresponding to respective ones of (i) a root volume and (ii) multiple snapshots related directly or indirectly to the root volume, receive a request to read a data item from a given volume offset of a particular one of the volume nodes, determine a set of data descriptors for the given volume offset, determine a set of volume nodes of interest for the particular volume node, determine a contribution set based at least in part on the set of data descriptors and the set of volume nodes of interest, determine a read address for the data item as a function of the contribution set, and read the data item from the read address. Multiple iterations of this process are performed to read multiple data items.

For example, when some volume offset o is to be read from a volume v, a set of volumes of interest is determined. The set of volumes that are of interest for reading data from v is limited to v's ancestors. This is due to the fact that only ancestors are potential hosts to data descriptors that contribute to v. Of this set, the relevant ones are only those that are hosts to some data:

VI(v, o)=$\{v_i | v_i \in$Ancestors(v)$\wedge v_i \in$Host($D_o$)$\}$

Note that v is also a member in this set.

For example, considering the topology of V to be as illustrated in FIG. 2 and assuming the existence of the following data descriptors:

$D_o = \{\langle R, 1, A\rangle, \langle R, 3, B\rangle, \langle S_1, 3, D\rangle, \langle S_4, 9, E\rangle, \langle S_5, 11, F\rangle\}$ where: $\langle H, T, A\rangle$ corresponds to a data item whose host is H, time is T, and address is A.

Then:
VI($S_9$, o)=$\{R, S_5\}$
VI($S_1$, o)=$\{R, S_1\}$
VI($S_4$, o)=$\{R, S_1, S_4\}$ A contribution set is illustratively determined from the set of volumes of interest in the following manner. Of the set of interest VI(v, o), potential contributors to reading v consist of only those data descriptors where v itself is the host, or whose time is earlier than that of v. This subset of VI(v, o) can be further narrowed-down, yielding a superior performance when searching for the correct member of VI(v, o). To achieve this, the set of contributors illustratively includes only those data descriptors that satisfy:

$$\text{Contributors}(v, o) = \begin{cases} d_o, & \text{Host}(d_o) = v \\ d_o \mid \text{Host}(d_o) \in VI(v, o) \wedge \text{Time}(d_o) < \\ \quad \text{Time}(\textit{IntermediateParent}(v, \text{Host}(d_o))), & \text{otherwise} \end{cases}$$

For example, considering the topology of V to be as illustrated in FIG. 2 and assuming the existence of the following data descriptors:

$D_o = \{d_{o,1}:\langle R, 1, A\rangle, d_{o,2}:\langle R, 3, B\rangle, d_{o,3}:\langle S_1, 5, D\rangle, d_{o,4}:\langle S_3, 11, E\rangle, d_{o,5}:\langle S_5, 11, F\rangle\}$ Then:
Contributors($S_9$, o)=$\{d_{o,1}, d_{o,2}, d_{o,5}\}$
Since:
VI($S_9$, o)=$\{R, S_5\}$
Time($d_{o,5}$)=11<Time(IntermediateParent($S_9$, $S_5$))=Time($S_7$)=12
Time($d_{o,1}$)=1<Time(IntermediateParent($S_9$, R))=Time($S_2$)=6
Time($d_{o,2}$)=3<Time(IntermediateParent($S_9$, R))=Time($S_2$)=6

And also:
Contributors($S_4$, o)={$d_{o,1}$}
Since:
VI($S_4$, o)={R, $S_1$}
Time($d_{o,1}$)=1<Time(IntermediateParent($S_4$, R))=Time($S_1$)=2
Time($d_{o,2}$)=3>Time(IntermediateParent($S_4$, R))=Time($S_1$)=2
Time($d_{o,3}$)=5>Time(IntermediateParent($S_4$, $S_1$))=Time($S_4$)=4

In an illustrative embodiment of the above-noted algorithm for efficient reading of data from stored snapshots, when volume v is read from at offset o, the address of the data item to be returned is computed as follows:

$$\text{read}(v, o) = \text{Address}\left(\max_{time} \text{Contributors}(v, o)\right)$$

Where $\max_{time}(d_o, d'_o)$ is given by:

$$\max_{time}(d_o, d'_o) = \begin{cases} d_o, & \text{Time}(d_o) > \text{Time}(d'_o) \wedge \text{Time}(\text{Host}(d_o)) = \text{Time}(\text{Host}(d'_o)) \\ d_o, & \text{Time}(\text{Host}(d_o)) > \text{Time}(\text{Host}(d'_o)) \\ d'_o, & \text{otherwise} \end{cases}$$

Following the same example above, it can be seen that:
read($S_9$, o)=Address(max{$d_{o,1}$, $d_{o,2}$, $d_{o,5}$})=Address($d_{o,5}$)=F
read($S_4$, o)=Address(max{$d_{o,1}$})=Address($d_{o,1}$)=A A wide variety of different implementations of the above-described algorithm are possible. Without loss of generality, we will now describe an example implementation of the algorithm described above. This example implementation is presented by way of illustrative example only, and other implementations can be used in other embodiments.

It is assumed for this implementation that the volume snapshot tree is implemented as a generic graph where vertices represent both the root volume and its snapshots. Outgoing edges from v represent direct descendants of v, leading to all members of Children(v). Traversal from a node v upwards towards the root volume using incoming edges allows computation of Ancestors(v) at cost O(n) time complexity. Each vertex v's value includes its recorded creation time: Time(v).

Given an upper bound on the total number of allowed snapshots per volume, $n_{max}$, it is possible to place all vertices $v_i$ in an array such that $v_i$ is hosted in entry i of that array, thereby facilitating O(1) time complexity for random-access to these vertices. Edges in the graph can thus be recorded as a bitmap of $n_{max}$ bits, where bit i corresponds to vertex i; a set bit corresponds to an edge (v, $v_i$) between v and $v_i$ denoting that $v_i \in$ Children(v). Each vertex v's value includes such a bitmap.

In a manner similar to that described above for Children(v), it is possible to have each vertex v keep a bitmap of $n_{max}$ bits that records all of its Ancestors(v): a set bit i indicates that $v_i \in$ Ancestors(v). Thus, the computation of Intermediate Parent (v, v') can be implemented as follows:

Intermediate Parent(v, v')=Children(v')∧Ancestors(v)

This can be achieved by applying a bitwise-AND operation of the two bitmaps, whose time complexity can be considered O(k), where k→1 since it consists of at most $$\frac{n_{max}}{8}$$

byte operations, and often less, depending on the value of $n_{max}$, the available machine-word length, and the supported machine instruction-set.

Computing the index of the bit that remains set and which corresponds to the index of the intermediate parent can be done using well-known techniques that execute at O(1) time complexity per machine-word.

Additionally, at the expense of $n_{max}^2$ space, it is possible to keep a matrix where the intersection of each row i with column j records the result of IntermediateParent($v_i$, $v_j$) which can be computed only once (as described above) upon the creation of a new snapshot, and then accessed at exactly O(1) time complexity every time that the computation of IntermediateParent(v,v') is required, as previously described.

Representing a single data item $d_o$ corresponding to offset o within some volume v can be done in a simple manner as a tuple of the fields described previously.

A set of data descriptors $D_o$ as defined above is represented as an ordered list of such descriptors, where members are sorted in ascending order of Time($d_o$) values: $D_o$={$d_{o,i}$|Time($d_{0,i}$)≤Time($d_{0,i+1}$)}.

FIG. 3 shows an example implementation of the algorithm read(v, o) for efficient reading of data from stored snapshots, utilizing the above-described techniques. Again, numerous other implementations are possible.

Additional illustrative embodiments providing algorithms for efficient reclamation of snapshot storage space will now be described with reference to FIG. 4. Such reclamation algorithms in some embodiments utilize the above-described efficient algorithms for reading of data from stored snapshots, such as the algorithm read(v, o) of FIG. 3. The reclamation algorithms in some embodiments provide efficient techniques for locating pieces of uniquely-written data of sparsely-populated snapshots, in order to facilitate reclaiming the storage space associated with such pieces in conjunction with deletion of one or more snapshots and/or the source volume.

The embodiments to be described below are therefore configured to address the problem of supporting snapshot deletion, in that all the metadata that services reads from the snapshot to be deleted must be visited for it to be modified or otherwise eliminated. A naïve approach would be exhaustively traversing all the metadata for all the snapshots, or at least for the snapshot's ancestors. However, for optimal performance, it is desirable that only those metadata which are relevant to the snapshot to be deleted are actually visited, yielding a time complexity that is proportional to the amount of effort invested in writing data associated with the snapshot to be deleted (i.e., either uniquely written into it or delegated to it from ancestors). Illustrative embodiments described below are configured to provide these and other advantageous storage space reclamation features.

In some embodiments of this type, one or more storage controllers or other processing devices of a storage system maintain a snapshot tree data structure having a plurality of volume nodes corresponding to respective ones of (i) a root volume and (ii) multiple snapshots related directly or indirectly to the root volume, determine a set of data descriptors for a given volume offset, determine a set of reader volume nodes that are readers of a corresponding data item based at least in part on the set of data descriptors, adjust one or more of the data descriptors in the set of data descriptors based at least in part on the set of reader volume nodes, and reclaim storage space previously allocated to the data item responsive to the adjusting of the one or more data descriptors.

For example, reclaiming storage space can comprise deleting data items and their associated descriptors and/or deleting one or more snapshots, such that the storage space previously occupied thereby is releases for use in storing other data items or snapshots. Other types of reclaiming can be performed in other embodiments.

Terms such as "responsive to" as used herein are intended to be broadly construed, and should not be interpreted as requiring any particular amount of time between a detected event and a corresponding action taken. For example, the action need not occur immediately upon detection of the event.

Note that for the sake of the following discussion, and without loss of generality, the term "snapshot" could also refer to the very first copy, sometimes referred to herein as the "source volume."

These embodiments introduce the notion of data ownership. A volume v in some volume snapshot tree V is said to be the "owner" of some data item $d_o$ at some volume offset o if the data item was either written into v, or was delegated to it at some later point in time. Formally, Owner($d_o$)=v. Note that when a data item is first written into some volume, that volume is both its host and its owner; however, it is not a requirement that this status endures. Note also that at any given time, any data item can have exactly one owner.

The data descriptors in this embodiment are more particularly defined in the following manner to include an owner. A data item $d_o$ is uniquely described by the set consisting of its host, its owner, its write time, and the actual data (or a reference to its address on disk). Formally, $d_o$=(Host($d_o$), Owner($d_o$), Time($d_o$), Address($d_o$)).

Given some data item $d_o$ whose address is Address($d_o$), the set of volumes that are readers of this address is defined as a collection of all volumes who are redirected to $d_o$ when offset o is read from them:

VR($d_o$)={$v_i$|read($v_i$, o)=$d_o$} where read(v, o) is assumed to be performed in the manner shown in FIG. 3.

For example, considering the topology of V to be as illustrated in FIG. 2 and assuming the existence of the following data descriptors:

$D_o$={$d_{o,1}$:<R, R, 1, A>, $d_{o,2}$:<R, R, 3, B>, $d_{o,3}$:<$S_1$, $S_1$, 5, C>, $d_{o,4}$: <$S_3$, $S_3$, 11, D>, $d_{o,5}$: <$S_5$, $S_5$, 11, E>}

Then:
VR($d_{o,1}$)={$S_4$}
VR($d_{o,2}$)={R, $S_2$}
VR($d_{o,3}$)={$S_1$}
VR($d_{o,4}$)={$S_3$}
VR($d_{o,5}$)={$S_5$, $S_6$, $S_7$, $S_8$, $S_9$}

When a volume offset o is rewritten in some volume v, the pre-existing data item $d_o$ may become obsolete if: VR($d_o$)=∅. In this case, it may be purged along with its descriptor. However, if VR($d_o$)≠∅, then both the data item and its descriptor must be preserved.

An algorithm for efficient reclamation will now be described in more detail.

Whenever a data item is first created, its owner is the host volume into which the data item was written.

Whenever a volume offset o is rewritten in some volume v and the pre-existing data item retains its necessity, then its owner is reassigned to any of the volumes in its set of readers.

Thus:

$$\text{Owner}(d_o) = \begin{cases} \text{Host}(d_o), & \text{Host}(d_o) \in VR(d_o) \\ v \mid v \in VR(d_o), & \text{otherwise} \end{cases}$$

Note that $d_o$ always retains its host.

For example, considering the topology of V to be the one illustrated in FIG. 2 and assuming the existence of the following unadjusted data descriptors:

$D_o$={$d_{o,1}$:<R, R, 1, A>, $d_{o,2}$:<R, R, 3, B>, $d_{o,3}$:<$S_1$, $S_1$, 5, C>, $d_{o,4}$: <$S_3$, $S_3$, 11, D>, $d_{o,5}$: <$S_5$, $S_5$, 11, E>}

One can observe that $d_{o,2}$ represents a rewrite that occurred at time 3 in volume R, overwriting $d_{o,1}$. Since VR($d_{o,1}$)={$S_4$}, $d_1$ remains necessary. As a result, its owner should be adjusted to denote $S_4$.

The final adjusted set of data descriptors for volume offset o is therefore:

$D_o$={$d_{o,1}$:<R, $S_4$, 1, A>, $d_{o,2}$:<R, R, 3, B>, $d_{o,3}$:<$S_1$, $S_1$, 5, C>, $d_{o,4}$: <$S_3$, $S_3$, 11, D>, $d_{o,5}$: <$S_5$, $S_5$, 11, E>}

To obtain a proportional deletion effort of volume v, the total set of data descriptors that need to be visited consists of all data items whose owner is v, across all offsets:

DeletionSet(v)={∀ o∈V: $d_o$|$d_o$∈$D_o$∧Owner($d_o$)=v}

The above yields optimal time-complexity both when rewrites occur, and upon volume deletion. More particularly:

1. Upon rewrites, none of the volumes that are members of VR($d_o$) are accessed for modification; only the assignment of ownership for $d_o$ is potentially modified at O(1) effort.

2. Upon deletion, only data descriptors that are members of the "deletion set" are accessed, instead of scanning all data descriptors belonging to Ancestors(v).

Without loss of generality, we shall now describe one possible implementation of the algorithm described above. Again, numerous alternative implementations are possible.

This implementation makes use of the algorithm read(v, o) as shown in FIG. 3. Given some set of data descriptors $D_o$, one can compute VR($d_o$) for any $d_o$∈$D_o$ by running read (v, o) for each v where Host($d_o$)∈Ancestors(v):

1. Given some $d_o$,
   Set VR:=∅
   Set Candidates:={Host($d_o$)}∪Children(Host($d_o$))
2. For each $v_i$∈Candidates:
   a. If read($v_i$, o)=$d_o$, then:
      VR:=VR∪{$v_i$}
   b. Candidates:=Candidates∪{Children($v_i$)}
   c. Remove $v_i$ from Candidates
3. Return VR Whenever a rewrite of some offset o mandates the reassignment of ownership of $d_o$, the set of readers for $d_o$, VR($d_o$), is computed as described previously. The new owner must be a member in this set, since all members of this set require $d_o$ to service reads of offset o, whereas the previous owner no longer requires it.

The choice of which member in this set should assume ownership can be made using various techniques, including by way of example random choice and preferred members, both described below.

Randomly choosing a member of VR($d_o$) is a viable choice in the lack of additional information or special preference. As one example of this approach, if VR($d_o$) is kept unordered, then simply selecting its first member is sufficient.

A preference towards a specific member of VR($d_o$) may be utilized. A possible example of such a preference is to choose the member that was created last; i.e., whose Time(v) is the biggest. Such a choice could be suggestive of the expectation that this member is the least probable to be rewritten or deleted. To support this, VR($d_o$) is kept sorted by Time(v).

Given that the magnitude of the domain of data descriptors, |D|, could be rather large, the task of computing DeletionSet(v) becomes an important challenge in some implementations.

Assume now that data descriptors for some volume snapshot tree V are stored densely in memory and/or disk; this trait can be easily sustained if an upper bound is set on the quantity of data descriptors.

This upper bound can be obtained, for instance, by $|V| \times (1+S_{max})$, where: |V| is given by the number of available volume offsets, which in itself is the product of:

$$\frac{Size(V)}{Size\ (data\ item)},$$

and $S_{max}$ is the system's limit on the number of allowed concurrent snapshots per volume.

Thus, knowing the size of a data descriptor, it is possible to reserve a contiguous memory and/or disk space to host all of the volume's data descriptors. Usually memory and disk space are organized in blocks of a predefined fixed size; the actual size is not important (it may be vendor/system specific).

Hence the problem of establishing DeletionSet(v) can be narrowed down to a problem of locating the memory/disk blocks hosting the relevant $d_{o,i}$.

Figure 4:
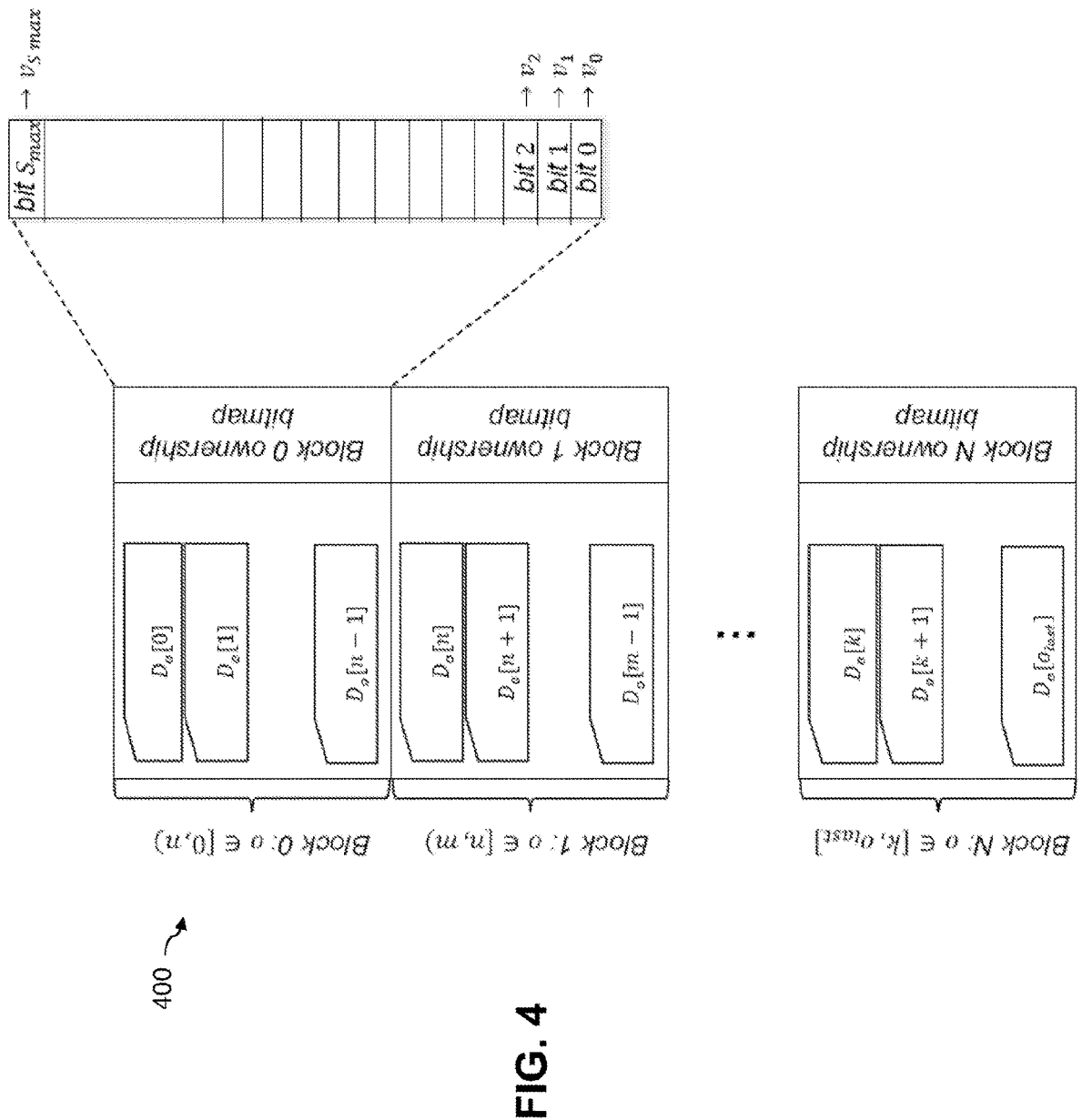
FIG. 4 shows an example data structure utilized in conjunction with efficient reclamation of snapshot storage space in an illustrative embodiment.

FIG. 4 shows an example of a data structure 400 utilized to solve this problem in an illustrative embodiment. The data structure 400 is an example of what is more generally referred to herein as a "block data structure" that comprises a plurality of block ownership bitmaps for respective ones of a plurality of blocks associated with respective distinct volume offset ranges. As will be described in more detail below, each of the block ownership bitmaps indicates for each of the volume nodes whether or not that volume node is an owner volume node for any of the data descriptors in the corresponding block. Other data structures can be used in conjunction with efficient reclamation of snapshot storage space in other embodiments.

In the data structure 400, data descriptors are stored into memory/disk blocks in an ascending order of volume offset. Thus, the first block hosts $D_o$ where $o \in [0, n)$, the second block hosts $D_o$ where $o \in [n, m)$, and so on until the last offset available in V.

A mapping function is utilized for this purpose, mapping $o \rightarrow [i, j]$ where i is the address of the first block where o is hosted and j is the address of the last block where o is hosted. This mapping function could be implemented, for example, using a hash.

Each block has an associated bitmap of $1+S_{max}$ bits corresponding to each of the possible snapshots and the root volume. A set bit i in this block ownership bitmap corresponds to a snapshot $v_i$ which has at least one data descriptor where $v_i$ is the owner, hosted in that block:

$$BlockOwnershipBitmap(i) = \begin{cases} 1, & \exists d_o \in D_o : Owner(d_o) = v_i \\ 0, & otherwise \end{cases}.$$

The collection of block ownership bitmaps can be kept resident in memory and/or disk, and only the relevant bitmaps(s) can be updated when writes are made into offsets hosted in their associated blocks, at O(k) cost, where $k \propto |blocks\ hosting\ offset\ o|$.

The data structure 400 supports functionality referred to herein as "proportional volume deletion."

Realization of proportional deletion in some embodiments can be achieved by traversing all block ownership bitmaps for some V. Instead of visiting all blocks associated with V, it is sufficient to discover which blocks actually participate in DeletionSet(v) and visit only those. It is expected that a typical block can host a significant number of data descriptors, thus the implementation described herein constitutes a significant improvement, when the resource of importance are disk accesses. In certain implementations it could be possible to keep all of the block ownership bitmaps resident in memory, further decreasing total effort associated with deletion.

The particular algorithms, data structures and other snapshot processing functionality described in conjunction with the embodiments of FIGS. 2 through 4 are presented by way of illustrative example only, and should not be construed as limiting the scope of the disclosure in any way. Alternative embodiments can use other types of algorithms, data structures and processing operations to provide snapshot processing functionality.

Such snapshot processing functionality can be implemented at least in part in the form of one or more software programs stored in memory and executed by a processor of a processing device such as a computer or server.

As will be described below, a memory or other storage device having executable program code of one or more software programs embodied therein is an example of what is more generally referred to herein as a "processor-readable storage medium."

For example, storage controllers such as storage controllers 108 of storage nodes 102 that are configured to control performance of the FIG. 3 algorithm and/or maintenance of the data structures of FIGS. 2 and 4 in their corresponding system 100 can be implemented as part of what is more generally referred to herein as a processing platform comprising one or more processing devices each comprising a processor coupled to a memory. A given such processing device may correspond to one or more virtual machines or other types of virtualization infrastructure such as Docker containers or Linux containers (LXCs). The storage controllers 108, as well as other system components, may be implemented at least in part using processing devices of such processing platforms. For example, in a distributed implementation of a given one of the storage controllers 108, respective distributed modules of such a storage controller can be implemented in respective containers running on respective ones of the processing devices of a processing platform.

Illustrative embodiments of a storage system with efficient reading of data from stored snapshots and/or efficient reclamation of snapshot storage space as disclosed herein can provide a number of significant advantages relative to conventional arrangements.

For example, some embodiments provide highly efficient algorithms for identifying the appropriate snapshot from which a given data item should be read, a process also referred to herein as "snapshot resolution," and for reading the given data item from that identified snapshot.

Other embodiments implement highly efficient algorithms for reclaiming storage space that is no longer needed to store particular data items.

Such algorithms are advantageously configured in some embodiments to support overwrites of data items and deletion of snapshots, with the former introducing multiple metadata entries per the same volume offset and the latter purging such entries.

Snapshot processing functionality as disclosed herein can be implemented in one or more storage nodes of a storage system, in one or more compute node, or partially in one or more storage nodes of a storage system and partially in one or more compute nodes.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement compute nodes and storage systems with snapshot processing functionality will now be described in greater detail with reference to FIGS. 5 and 6. Although described in the context of system 100, these platforms may also be used to implement at least portions of other information processing systems in other embodiments.

Figure 5:
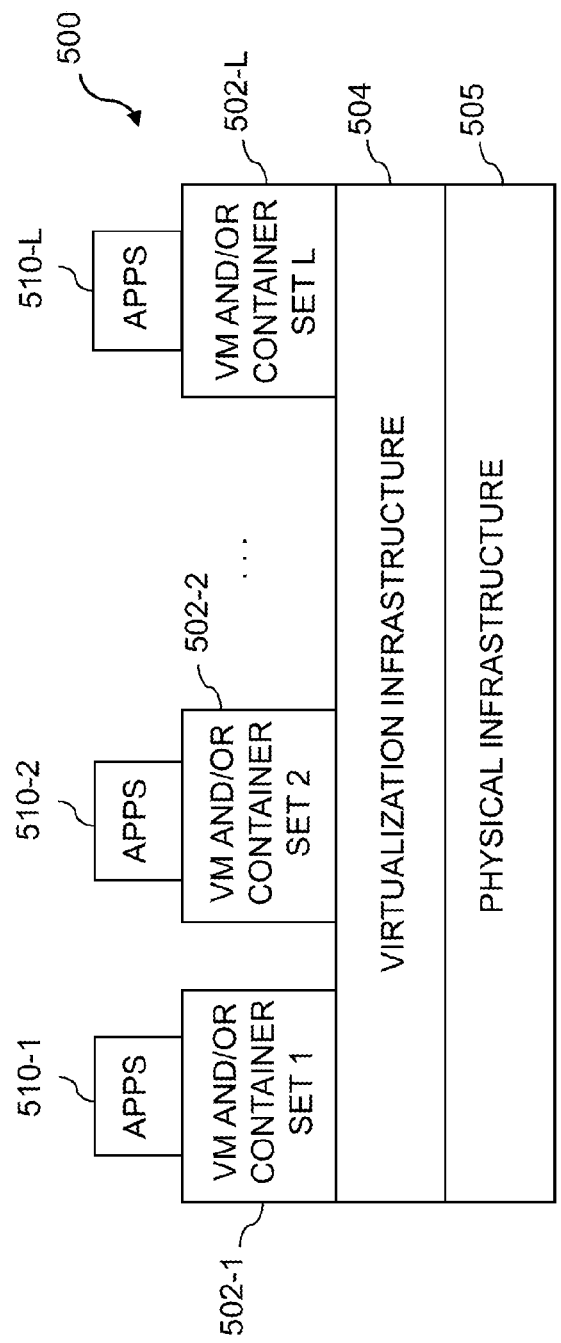
FIGS. 5 and 6 show examples of processing platforms that may be utilized to implement at least a portion of an information processing system in illustrative embodiments.
Figure 6:
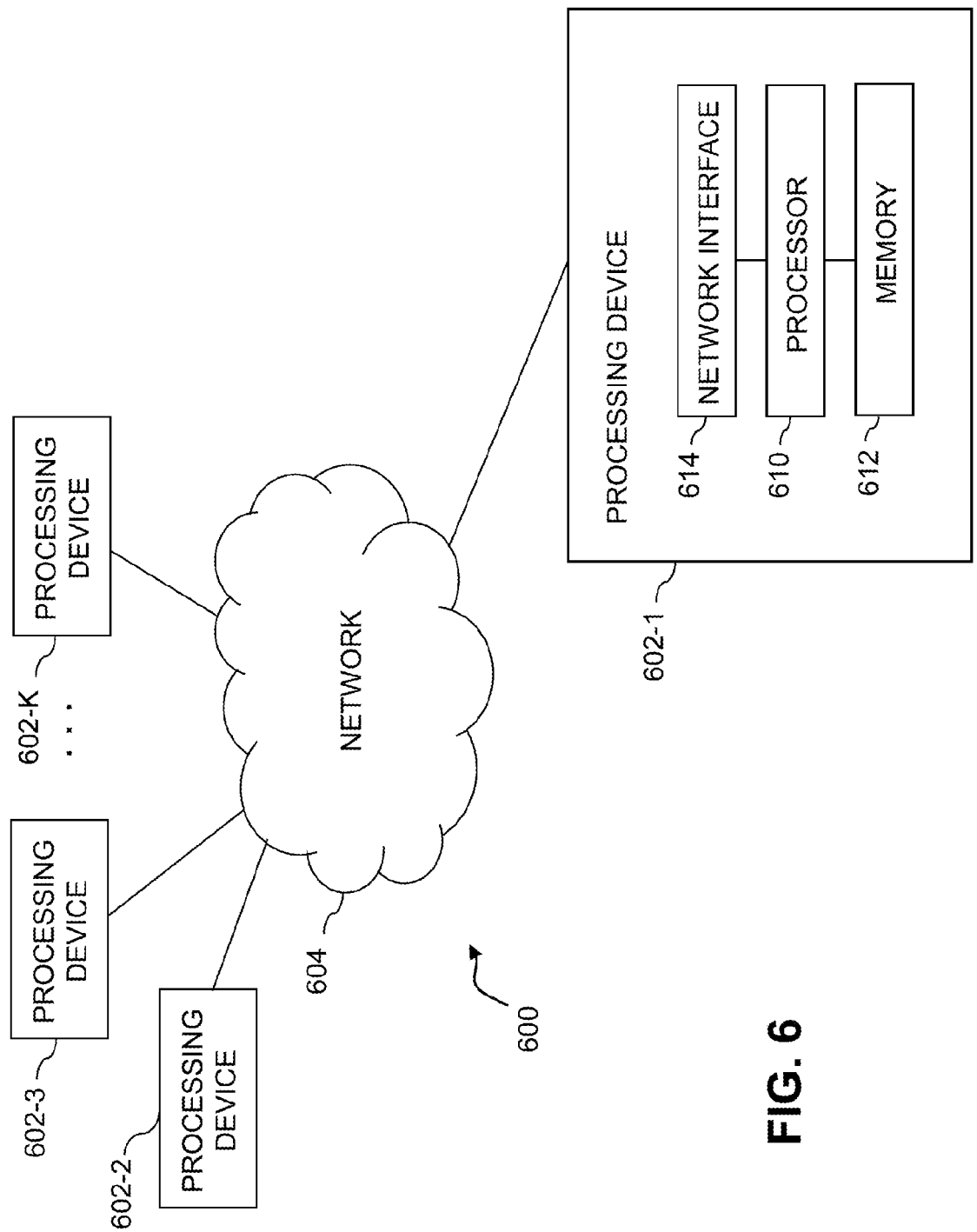

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide snapshot processing functionality of the type described above for one or more processes running on a given one of the VMs. For example, each of the VMs can implement replication control logic and/or snapshot generators for providing snapshot processing functionality in the system 100.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can also provide snapshot processing functionality of the type described above. For example, a container host device supporting multiple containers of one or more container sets can implement one or more instances of replication control logic and/or snapshot generators for providing snapshot processing functionality in the system 100.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), graphics processing unit (GPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the snapshot processing functionality of one or more components of a storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, compute nodes, storage nodes, storage systems, storage devices, storage controllers, replication processes, snapshot generators and associated control logic and metadata structures. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   said at least one processing device being configured:
   to maintain a snapshot tree data structure having a plurality of volume nodes corresponding to respective ones of (i) a root volume and (ii) multiple snapshots related directly or indirectly to the root volume;
   to receive a request to read a data item from a given volume offset of a particular one of the volume nodes;
   to determine a set of data descriptors for the given volume offset;
   to determine a set of volume nodes of interest for the particular volume node;
   to determine a contribution set based at least in part on the set of data descriptors and the set of volume nodes of interest;
   to determine a read address for the data item as a function of the contribution set; and
   to read the data item from the read address;
   wherein determining the contribution set comprises identifying a particular subset of the set of data descriptors based at least in part on time values of one or more data items and time values of one or more volume nodes, a first one of the data items having a first time value indicating a time at which the data item was written in a snapshot corresponding to a first one of the volume nodes.

2. The apparatus of claim 1 wherein said at least one processing device is implemented at least in part within a snapshot-enabled storage system.

3. The apparatus of claim 2 wherein said at least one processing device comprises at least a portion of a storage controller of the snapshot-enabled storage system.

4. The apparatus of claim 2 wherein the snapshot-enabled storage system comprises a distributed storage system implemented by a plurality of storage nodes and having a distributed storage controller comprising multiple controller instances implemented on respective ones of the storage nodes.

5. The apparatus of claim 1 wherein each of at least a subset of the volume nodes of the snapshot tree data structure has an associated time value indicative of a creation time of the corresponding snapshot.

6. The apparatus of claim 5 wherein no two volume nodes of the snapshot tree data structure have the same time value.

7. The apparatus of claim 5 wherein the volume times of respective ones of the volume nodes comprise respective integer values that are incremented in conjunction with creation of each snapshot.

8. The apparatus of claim 5 wherein each of a plurality of data items associated with one or more of the volume nodes has an associated time value indicative of a write time of the data item to the corresponding snapshot.

9. The apparatus of claim 8 wherein the time values of the respective data items are unique relative to the time values of the volume nodes.

10. The apparatus of claim 9 wherein one of even-numbered integer values and odd-valued integer values are used for the time values of the volume nodes and the other of the even-numbered integer values and odd-valued integer values are used for the time values of the data items.

11. The apparatus of claim 1 wherein each of a plurality of data items associated with one or more of the volume nodes has a corresponding data descriptor that identifies its corresponding volume node, its time value and its read address.

12. The apparatus of claim 1 wherein the set of volume nodes of interest for the particular volume node comprises any volume node of the snapshot tree data structure that is both an ancestor of the particular volume node and hosts a data item of at least one of the data descriptors of the set of data descriptors for the given volume offset.

13. The apparatus of claim 1 wherein the contribution set comprises one or more data descriptors in the set of data descriptors that is (i) hosted by the particular volume node or (ii) in the set of volume nodes of interest and has a time value that is earlier in time than a time value of the particular volume node.

14. The apparatus of claim 1 wherein determining the contribution set comprises determining the contribution set based at least in part on one or more intermediate parents of the particular volume node, a given one of the intermediate parents of the particular volume node relative to another volume node denoting a volume node that is both an ancestor of the particular volume node and a child of the other volume node.

15. The apparatus of claim 14 wherein determining the contribution set comprises utilizing the one or more intermediate parents to identify the particular subset of the set of data descriptors based at least in part on the time values of one or more data items and the time values of one or more volume nodes.

16. A method comprising:
maintaining a snapshot tree data structure having a plurality of volume nodes corresponding to respective ones of (i) a root volume and (ii) multiple snapshots related directly or indirectly to the root volume;
receiving a request to read a data item from a given volume offset of a particular one of the volume nodes;
determining a set of data descriptors for the given volume offset;
determining a set of volume nodes of interest for the particular volume node;
determining a contribution set based at least in part on the set of data descriptors and the set of volume nodes of interest;
determining a read address for the data item as a function of the contribution set; and
reading the data item from the read address;
wherein determining the contribution set comprises identifying a particular subset of the set of data descriptors based at least in part on time values of one or more data items and time values of one or more volume nodes, a first one of the data items having a first time value indicating a time at which the data item was written in a snapshot corresponding to a first one of the volume nodes; and
wherein the method is performed by at least one processing device comprising a processor coupled to a memory.

17. The method of claim 16 wherein determining the contribution set comprises determining the contribution set based at least in part on one or more intermediate parents of the particular volume node, a given one of the intermediate parents of the particular volume node relative to another volume node denoting a volume node that is both an ancestor of the particular volume node and a child of the other volume node.

18. The method of claim 17 wherein determining the contribution set comprises utilizing the one or more intermediate parents to identify the particular subset of the set of data descriptors based at least in part on the time values of one or more data items and the time values of one or more volume nodes.

19. A computer program product comprising a non-transitory processor-readable storage medium having stored therein program code of one or more software programs, wherein the program code when executed by at least one processing device causes said at least one processing device:
to maintain a snapshot tree data structure having a plurality of volume nodes corresponding to respective ones of (i) a root volume and (ii) multiple snapshots related directly or indirectly to the root volume;
to receive a request to read a data item from a given volume offset of a particular one of the volume nodes;
to determine a set of data descriptors for the given volume offset;
to determine a set of volume nodes of interest for the particular volume node;
to determine a contribution set based at least in part on the set of data descriptors and the set of volume nodes of interest;
to determine a read address for the data item as a function of the contribution set; and
to read the data item from the read address;
wherein determining the contribution set comprises identifying a particular subset of the set of data descriptors based at least in part on time values of one or more data items and time values of one or more volume nodes, a first one of the data items having a first time value indicating a time at which the data item was written in a snapshot corresponding to a first one of the volume nodes.

20. The computer program product of claim 19 wherein determining the contribution set comprises determining the contribution set based at least in part on one or more intermediate parents of the particular volume node, a given one of the intermediate parents of the particular volume node relative to another volume node denoting a volume node that is both an ancestor of the particular volume node and a child of the other volume node.

* * * * *